(12) United States Patent
Wittenstein et al.

(10) Patent No.: US 7,094,178 B2
(45) Date of Patent: Aug. 22, 2006

(54) DRIVE CONTROL

(75) Inventors: Manfred Wittenstein, Bad Mergentheim (DE); Thomas Bayer, Igersheim (DE)

(73) Assignee: Wittenstein AG, Igersheim (DE)

( * ) Notice: Subject to any disclaimer, the term of this patent is extended or adjusted under 35 U.S.C. 154(b) by 0 days.

(21) Appl. No.: 10/479,494

(22) PCT Filed: Mar. 9, 2002

(86) PCT No.: PCT/EP02/02609

§ 371 (c)(1),
(2), (4) Date: Dec. 2, 2003

(87) PCT Pub. No.: WO02/098697

PCT Pub. Date: Dec. 12, 2002

(65) Prior Publication Data

US 2004/0152561 A1    Aug. 5, 2004

(30) Foreign Application Priority Data

Jun. 6, 2001  (DE)  .................... 101 27 308

(51) Int. Cl.
*G06F 7/00* (2006.01)
*G06F 17/00* (2006.01)
*G06F 19/00* (2006.01)

(52) U.S. Cl. .......................... 477/97; 701/60

(58) Field of Classification Search ........... 477/97, 477/107; 701/33, 60, 6
See application file for complete search history.

(56) References Cited

U.S. PATENT DOCUMENTS

| 5,033,328 | A  | * | 7/1991 | Shimanaka | .............. | 477/109 |
| 5,107,425 | A  | * | 4/1992 | Donges et al. | .............. | 701/33 |
| 5,325,082 | A  | * | 6/1994 | Rodriguez | .............. | 340/438 |
| 5,369,581 | A  | * | 11/1994 | Ohsuga et al. | .............. | 701/48 |
| 5,679,091 | A  | * | 10/1997 | Salecker et al. | .............. | 477/86 |
| 6,009,370 | A  | * | 12/1999 | Minowa et al. | .............. | 701/102 |
| 6,125,314 | A  | * | 9/2000 | Graf et al. | .............. | 701/53 |
| 6,188,945 | B1 | * | 2/2001 | Graf et al. | .............. | 701/58 |
| 6,321,150 | B1 | * | 11/2001 | Nitta | .............. | 701/29 |
| 6,463,373 | B1 | * | 10/2002 | Suganuma et al. | .............. | 701/48 |
| 6,512,970 | B1 | * | 1/2003 | Albert | .............. | 701/48 |
| 6,662,091 | B1 | * | 12/2003 | Wilson et al. | .............. | 701/33 |
| 6,662,642 | B1 | * | 12/2003 | Breed et al. | .............. | 73/146 |
| 6,810,314 | B1 | * | 10/2004 | Tashiro et al. | .............. | 701/48 |

* cited by examiner

*Primary Examiner*—Tisha Lewis
(74) *Attorney, Agent, or Firm*—Bachman & LaPointe, P.C.

(57) ABSTRACT

A drive control for controlling a gear system which is connected to a motor. The drive control comprises one or several sensors for detecting operationally specific parameters of the gear system, and a decentralized sensor evaluation unit. The sensor or each sensor is connected to the decentralized sensor evaluation unit for separate evaluation of information provided by the sensor or sensors.

7 Claims, 1 Drawing Sheet

DRIVE CONTROL

BACKGROUND OF THE INVENTION

The present invention relates to drive regulation for open-loop and/or closed-loop control of a transmission which is connected to a motor or engine.

In the prior art, transmissions are generally controlled by means of a higher-level controller or control system, which acts on power and control electronics and controls the motor or engine by influencing the power supply. The motor or engine in turn generally acts on a machine via a transmission.

EP 1 055 547 A1 describes an apparatus for electronic control of rail vehicle drive components with a control device for electronic control of the drive components. In this case, the individual components of the control device are arranged decentralized with respect to one another and are coupled to one another via a communication network.

U.S. Pat. No. 5,033,328 discloses a drive with a connected transmission, in which the pressure which is produced in a linear drive or transmission can be determined and established via a sensor element.

U.S. Pat. No. 4,866,622 describes a drive system for a motorcycle, having an electrical drive whose braking process can be influenced electronically by means of an electronic controller or control system.

Accordingly, it is an object of the present invention to improve the open-loop and closed-loop control of drives, of motors or engines, and/or of transmissions.

SUMMARY OF THE INVENTION

The foregoing object is achieved by way of the present invention, wherein a transmission which is connected to a motor or engine has one or more sensors for recording operation-specific parameters of the drive. Sensors such as these, may, for example, be tilting moment sensors, leakage sensors, torque sensors, temperature sensors or rotation speed sensors. The sensor system for the transmission allows information relating to the transmission to be identified and recorded, such as the tilting moment, the torque, the temperature, leakages, forces, crash or life.

Each sensor for the drive, in particular for the transmission, is connected to a decentralized sensor evaluation unit, which is preferably physically located on the motor or engine or on the transmission, or at least relatively physically close to it. The sensor evaluation unit autonomously evaluates the information which is supplied from the sensor or sensors. The information evaluated in this way can then, for example, also be checked by a central controller or control system.

The sensor evaluation unit, together with the sensor or sensors represents a decentralized intelligent information gathering and evaluation unit which makes it possible, for example, to form an information flow from the transmission to the central controller or control system, with the controller or control system then in turn being able to use the information obtained in this way for motor or engine control. The invention thus differs from conventional motor or engine controllers or control systems in which information flows in one direction from the central controller or control system in the direction of the motor or engine, but no information flows back.

In one preferred embodiment of the invention, the sensor evaluation unit furthermore has a control unit which makes it possible for the sensor evaluation unit to act directly on the transmission and/or to control it.

If, for example, a sealing ring or retaining ring starts to leak, then a second retaining ring can be connected for this purpose, automatically, in a decentralized manner and autonomously, by means of the control unit for the sensor evaluation unit.

This makes it possible for the sensor evaluation unit to autonomously provide closed-loop and open-loop control for the transmission or for a combination of a motor or engine and transmission by means of the sensor evaluation unit and, for example, to be designed for different forces, undesirable or specific torques, in operation.

The sensor evaluation unit preferably has a communication unit which makes it possible for the sensor evaluation unit to carry out data communication with external appliances, such as the central controller or control system, and/or which makes it possible for external appliances such as these to access the sensor evaluation unit. In this case, any adequate communication path may be used for the data communication, for example wire-free or cable-based transmission, for example, by means of a mobile radio system, hard wiring, a data network such as a local area network (LAN), Bluetooth or other transmission protocols.

BRIEF DESCRIPTION OF THE DRAWINGS

Further advantages, features and details of the invention can be found in the following description of a preferred exemplary embodiment, and from the drawing of this exemplary embodiment, in which.

DETAILED DESCRIPTION

Figure 1:
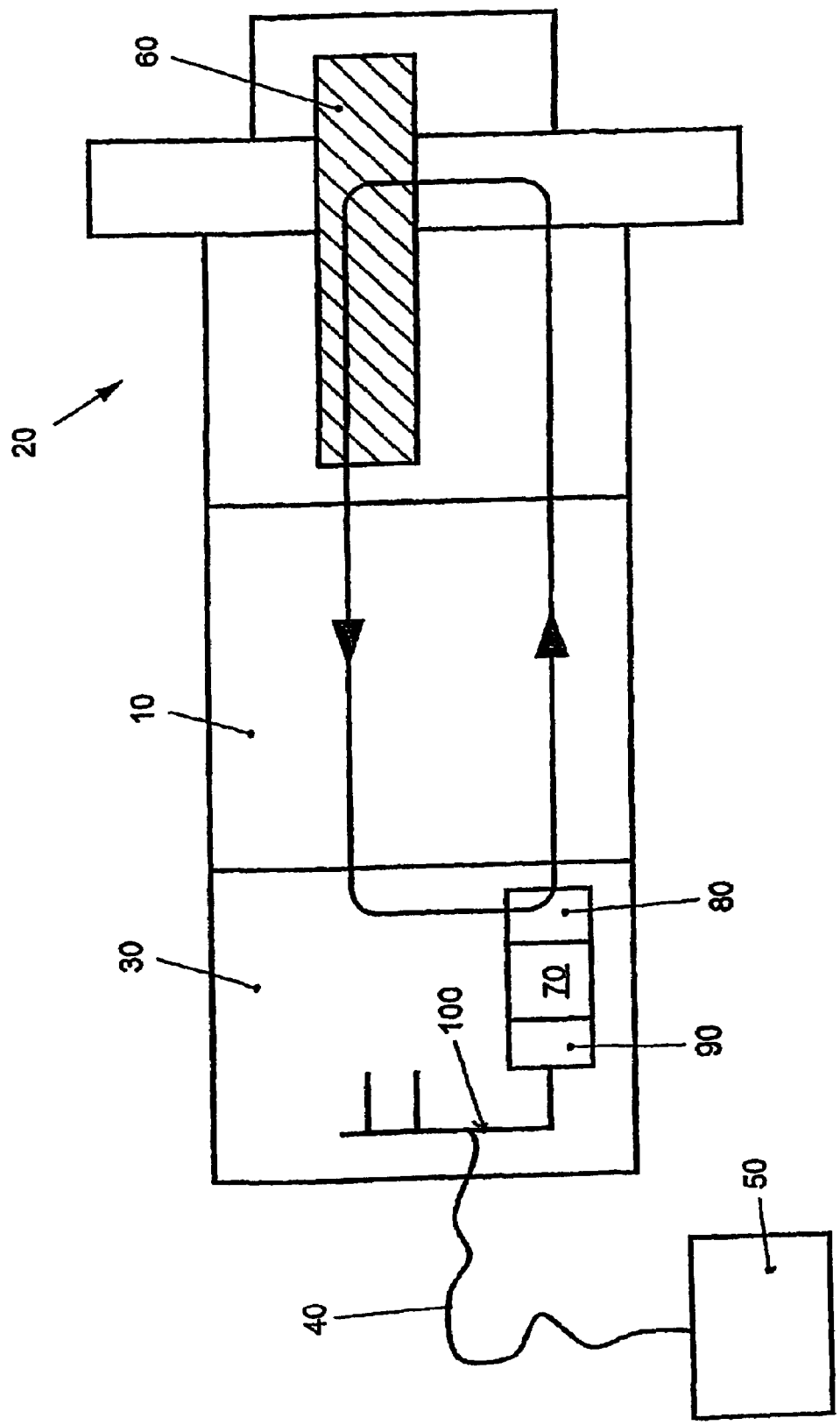
FIG. 1 shows a schematic block diagram of a motor or engine controller or control system according to the present invention.

In the exemplary embodiment shown in FIG. 1, a motor or engine 10 is connected to a transmission 20. Control and power electronics 30 allow electronic open-loop and closed-loop control of the motor or engine 10 either directly on the appliance or via a communication path 40 from an external appliance 50, such as a central controller or control system.

The transmission 20 furthermore has one or more sensors 60 which is or are either located on or at the transmission 20 or is or are connected to it. For the sake of simplicity, the following text is based on the assumption that there are a number of sensors 60.

The sensors 60 are connected to an evaluation unit 70 as is symbolized by the arrows in FIG. 1. The evaluation unit 70 for this purpose has a control unit 80 which on the one hand receives information from the sensors 60 and on the other hand allows information to be passed back to them.

The sensor evaluation unit 70 furthermore has a communication unit 90, which makes it possible for the sensor evaluation unit 70 to carry out data communication. For this purpose, the communication unit 90 is connected either directly or via a bus 100 for the control and power electronics 30 to the communication path 40. The communication unit 90 on the one hand makes it possible for the sensor evaluation unit 70 to make contact with the external appliance 50, for example for routine transmission of gathered data, or else for signaling of an alarm. On the other hand, the external appliance 50 can set up and carry out data communication with the sensor evaluation unit 70 via the communication unit 90, for example, to the extent that it is necessary for external central control.

When using torque sensors, the invention thus makes it possible to feed back torques which are measured on the output and/or input drive side, for example, as disturbance variables to a control loop. This allows the dynamic range of the motor or engine to be increased, stabilization times to be shortened, or regulation to be carried out adaptively. Furthermore, sensor signals can be used as control variables which makes it possible to carry out optimization, control or diagnosis on a manufacturing process. Finally, the decentralized sensor system and evaluation according to the invention allow information to be obtained about the current status of the machine. This allows, for example, a teleservice "as far as the machine" and allows the calculation of remaining life, black box analyses (for example "what has happened in the last five minutes"), the verification of a machine crash, service on demand, determination of customer-specific load profiles, status analysis of prototype machines, etc.

The invention claimed is:

1. A drive regulator for control of a transmission which is connected to a motor comprises:
    a transmission connected to an electrically driven motor;
    sensor means for recording operation specific parameters for the transmission, wherein the sensor means comprises a plurality of sensors including tilting moment sensors, leakage sensors, torque sensors, temperature sensors, rotation speed sensors, vibration sensors, oscillation sensors and oil-level sensors; and
    a decentralized sensor evaluation unit connected to the sensor means for receiving and evaluating the parameters from the sensor means, wherein the sensor evaluation unit is connected to a motor means of power electronics, and wherein the sensor evaluation unit (70) has a control unit (80) which includes means for the sensor evaluation unit (70) to act directly on the transmission (20) to obtain directly the specific parameters for the transmission.

2. The drive regulator as claimed in claim 1, wherein the sensor means or decentralized sensor evaluation unit (70) is located on or proximate to the motor or transmission (20).

3. The drive regulator as claimed in claim 1, wherein the sensor evaluation unit (70) together with the sensor means comprises a decentralized intelligent information gathering and evaluation unit.

4. The drive regulator as claimed in claim 1, wherein the sensor evaluation unit (70) has a communication unit (90) which includes means for the sensor evaluation unit (70) to data communicate with an external appliance (50).

5. The drive regulator as claimed in claim 1, in which the sensor evaluation unit (70) has a communication unit (90) which includes means for an external appliance (50) to data communicate with the sensor evaluation unit (70).

6. The drive regulator as claimed in claim 5, wherein the communication unit (90) includes means for the sensor evaluation unit (70) to data communicate with the external appliance (50).

7. The drive regulator as claimed in claim 1, wherein the sensor evaluation unit (70) forms a unit directly with the motor and/or the transmission (20), and includes means for autonomous regulation of the motor (10) and/or transmission (20) in response to specific signals from the sensor means (60).

* * * * *